(12) United States Patent
Giessl

(10) Patent No.: US 6,538,557 B1
(45) Date of Patent: Mar. 25, 2003

(54) DEVICE AND METHOD FOR SECURING A MOTOR VEHICLE AGAINST UNAUTHORIZED USE

(75) Inventor: Oliver Giessl, Straubing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/272,966

(22) Filed: Mar. 19, 1999

(30) Foreign Application Priority Data

Mar. 19, 1998 (DE) .......................... 198 12 210

(51) Int. Cl.⁷ .............................................. G05B 19/00
(52) U.S. Cl. .................. 340/5.2; 340/5.22; 340/825.69
(58) Field of Search ....................... 340/825.31, 825.56, 340/825.69, 825.34, 10.1, 5.1, 5.2, 5.21, 5.22, 5.28, 5.64, 5.72, 10.52, 825.72, 426; 370/10.1, 10.2; 70/337

(56) References Cited

U.S. PATENT DOCUMENTS

| 5,463,564 A | 10/1995 | Agrafiotis et al. |
| 5,473,318 A | 12/1995 | Martel |
| 5,479,156 A * | 12/1995 | Jones ..................... 340/5.21 |
| 5,574,656 A | 11/1996 | Agrafiotis et al. |
| 5,602,536 A | 2/1997 | Henderson et al. |
| 5,684,711 A | 11/1997 | Agrafoitis et al. |
| 5,705,991 A * | 1/1998 | Kniffin et al. ........... 340/5.21 |
| 5,712,171 A | 1/1998 | Zambias et al. |
| 5,719,551 A | 2/1998 | Flick |
| 5,736,412 A | 4/1998 | Zambias et al. |
| 5,901,069 A | 5/1999 | Agrafiotis et al. |
| 6,097,306 A * | 8/2000 | Leon et al. ............ 340/825.31 |

FOREIGN PATENT DOCUMENTS

| DE | 195 08 370 A1 | 9/1996 |
| EP | 0 731 007 A1 | 9/1996 |
| GB | 2 305 216 A | 4/1997 |
| GB | 2 331 547 A | 5/1999 |

OTHER PUBLICATIONS

International Patent Application WO 92/15761 (Bachhuber et al.), dated Sep. 17, 1992.
International Patent Application WO 97/22772 (Pogson et al.) dated Jun. 26, 1997.

* cited by examiner

Primary Examiner—Michael Horabik
Assistant Examiner—William Bangachon
(74) Attorney, Agent, or Firm—Laurence A. Greenberg; Werner H. Stemer; Gregory L. Mayback

(57) ABSTRACT

Each of the vehicle keys issued for a vehicle can be selectively authorized and blocked. A lost or stolen vehicle key can thus be selectively blocked, in which the vehicle still remains usable with the other vehicle keys. For each vehicle key, a use authorization can be stipulated in the form of an admissible number of uses or use duration. A pager receiver is provided in the vehicle, via which the key authorization information fed from the central office can be received and sent to a control unit, preferably a drive-away blocking control unit.

10 Claims, 1 Drawing Sheet

DEVICE AND METHOD FOR SECURING A MOTOR VEHICLE AGAINST UNAUTHORIZED USE

BACKGROUND OF THE INVENTION

FIELD OF THE INVENTION

The invention lies in the automotive art. Specifically, the invention concerns a device and method for securing a vehicle against unauthorized use.

A device for securing a vehicle against unauthorized use is known from German published patent application DE 195 08 370. There, a receiving antenna is mounted on the vehicle, via which signals sent from a central office can be received. A control unit is arranged in the vehicle, which stores use authorization information sent from the central office, at least temporarily. In other words, the vehicle being secured is equipped with a transmitting and receiving device to transmit data between the vehicle and a central office. Before release of the vehicle for utilization, bidirectional communication occurs between the vehicle and the central office, during which utilization restrictions are transmitted to the vehicle and stored in its anti-theft control unit. Utilization restriction can consist of stipulation of an admissible operating time or travel distance, or also the admissible number of startups of the vehicle or a maximum time interval of utilization independent of use. When the utilization restriction criteria are reached, the vehicle is shut down.

SUMMARY OF THE INVENTION

It is accordingly an object of the invention to provide a method and a device for securing a motor vehicle against unauthorized use, which overcomes the above-mentioned disadvantages of the heretofore-known devices and methods of this general type and which permits a refined allocation of utilization authorization to a vehicle.

With the foregoing and other objects in view there is provided, in accordance with the invention, a device for securing a motor vehicle against unauthorized use, wherein a plurality of keys are issued for the motor vehicle, comprising:

- a receiver including antenna mounted on a motor vehicle for receiving signals from a central office;
- a control unit disposed in the motor vehicle for storing use authorization information sent from the central office;
- at least some vehicle keys issued for the motor vehicle being assigned an identifier different from identifiers assigned to others of the vehicle keys, and the control unit being programmed to:
  - query the identifier of a corresponding vehicle key upon an actuation thereof;
  - determine a use authorization information stored for the corresponding vehicle key; and
  - release a function requested by the corresponding key only when use authorization is present.

At least some, preferably all, keys issued for a vehicle can be selectively authorized or blocked in the invention. For example, if a vehicle key is lost or stolen, the invention permits selective blocking of this vehicle key, so that the vehicle can no longer be opened and/or started by this key. However, the other keys still remain authorized so that the vehicle can continue to be used with these other keys. The authorized user can therefore have access to the vehicle in the usual manner, but without the hazard of vehicle theft with the lost or stolen key. No mechanical interventions into the door lock system or ignition lock system are required. The necessary data to block the lost or stolen key can be sent to the vehicle by the central office, notified by the authorized user, and stored in its control unit.

In accordance with an added feature of the invention, the control unit comprises a memory storing use restrictions for one or more vehicle keys, and wherein the control unit no longer accepts a vehicle key as valid if a corresponding use restriction stipulated for the respective key is reached.

In accordance with an additional feature of the invention, the use restriction is defined as a maximum admissible number of uses of the corresponding key stored in the control unit, and each use of a vehicle key is selectively counted for the corresponding vehicle key, and a vehicle key is classified as unauthorized upon reaching the maximum admissible number of uses stipulated therefor.

In accordance with a further feature of the invention, the control unit contains a memory storing a time value for the corresponding vehicle key, and the control unit no longer accepts as valid a vehicle key a time value of which has been reached.

In accordance with again an added feature of the invention, the time value is stored as an admissible number of use days.

In accordance with again another feature of the invention, the data received by the control unit from the central office contain a vehicle key identifier notifying the control unit for which respective vehicle key the transmitted information, such as a maximum use number and/or a time value, is to be stored.

With the above and other objects in view there is also provided, in accordance with the invention, a method of blocking a motor vehicle against unauthorized use, which comprises:

- selectively sending use authorization information for each of a plurality of vehicle keys of a motor vehicle from a central office to the motor vehicle, wherein each vehicle key is provided with its own identifier;
- upon an actuation of a respective vehicle key, determining its identifier and querying the use authorization information stored for the respective vehicle key; and
- accepting as valid only an authorized vehicle key.

As an alternative or in addition, it is thus also possible to stipulate, for each vehicle key, selectively determined use criteria, like maximum use frequency, use period or the like. As soon as a key reaches its utilization limit, it is no longer accepted by the vehicle control unit, i.e., no longer permits opening and/or starting of the vehicle until it is again classified as authorized via the central office.

Each of the keys issued for a vehicle can therefore be individualized with respect to its use authorization. However, it is not essential in all cases that all keys allocated to a specific vehicle be assigned mutually different utilization authorizations. It is also possible to classify the keys in groups with different utilization criteria and prescribe the same criteria for each key within a group. For example, this can be useful in larger companies, in which a certain vehicle is used by a number of persons, who are allocated to different person groups (for example, service employees/couriers/maintenance personnel). Moreover, it is possible to equip all keys issued for a specific vehicle initially with the same utilization rights and to adapt these utilization rights, as required, only according to certain situations. The information required for this is sent to the concerned vehicle by the central office (service provider) and stored in its control unit and/or transmitted to the corresponding key and recorded in it.

At least some, preferably all, keys prescribed for a certain vehicle contain their own identifier, which is queried by the control unit upon the actuation of the corresponding key (for opening the vehicle and/or operating the vehicle). The control unit preferably contains a memory, in which the utilization authorization and, optionally, the corresponding utilization parameters are stored for all admissible keys, for example, the admissible use frequency, etc. Upon an actuation of a key, the control unit queries the corresponding memory entry and decides from it whether the key is authorized or not. If it is not authorized, the control unit blocks opening of the vehicle and/or starting of the engine or another measure necessary for vehicle operation. However, if the key is recognized as authorized, key confirmation is accepted, i.e., the vehicle is opened or the engine started. If the maximum use frequency of the key is to be stipulated as utilization criterion, the thus far valid number of still admissible future uses is reduced by one and this value recorded in the control unit. As an alternative, the number of thus far executed key activations can also be counted and the current numerical value compared with a value stored in the control unit corresponding to the maximum use frequency stipulated for this key. If the latter value is reached, subsequent key activations are no longer accepted.

It is also possible to stipulate a use limit for a corresponding key in the form of a maximum time (for example, a total of 100 days' use authorization).

As an alternative, it is also possible to store the use authorization of a corresponding key not in a control unit memory, but to record it directly in the key itself. In this case, an additional memory field is present in the key, in addition to its stored identifier, in which the information "authorized" or "blocked" is contained, preferably in coded form. Bidirectional communication between the control unit and the corresponding vehicle key is prescribed here, in which the control unit, during key use, not only queries its identification, but also the use authorization stored in it. Only when the use authorization reads "authorized" is vehicle utilization permitted. If, however, an order is fed to the control unit from the central office to classify a certain vehicle key in the future as "unauthorized", the control unit stores this information until the corresponding key is used. The control unit recognizes this use with reference to the key identifier and then transmits data to the key that cause rewriting of the corresponding key memory position from "authorized" to "blocked". In the opposite case, when a previously blocked key is again treated as authorized, the control unit also transmits corresponding information to the key that causes rewriting of the corresponding key memory field to "authorized". The data are fed from the control unit to the key, preferably coded, so that the hazard of unauthorized authorization of a blocked key is minimized. In this embodiment, the amount of information that must be stored in the control unit is significantly reduced, since the keys themselves contain the use authorization information.

Other features which are considered as characteristic for the invention are set forth in the appended claims.

Although the invention is illustrated and described herein as embodied in device and a method for securing a vehicle against unauthorized use, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
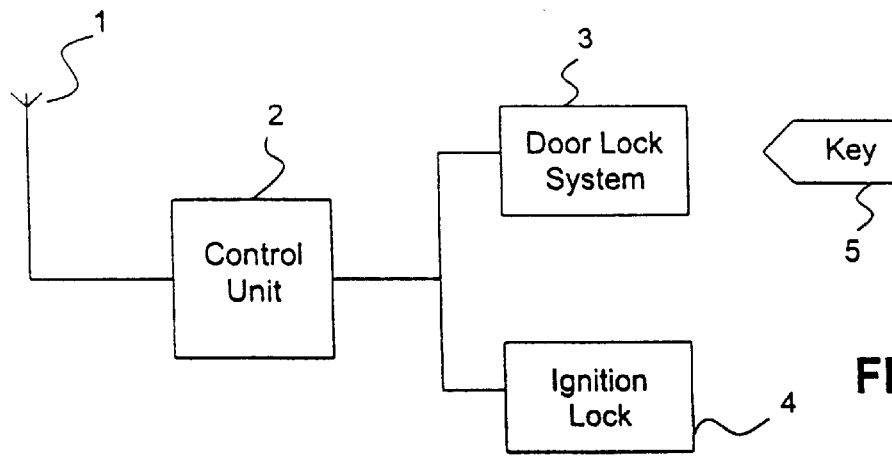
FIG. 1 is a block diagram of an exemplary embodiment of the device according to the invention.

Referring now to the figures of the drawing in detail and first, particularly, to FIG. 1 thereof, there is seen an exemplary embodiment of the system with a control unit 2 installed in a non-illustrated vehicle, which is in communications connection via a receiver containing an antenna 1 with a likewise non-illustrated central office (service provider). The communications connection may be bidirectional, so that information can be mutually exchanged between the central office and control unit 2. In the present exemplary embodiment, however, unidirectional data transmission from the central office to the control unit 2 is sufficient. The central office can be a component of a communications net for public, mobile telecommunication and receives from those authorized for utilization—usually the vehicle owners—information that is to be transmitted to the corresponding vehicle containing control unit 2. This information is then sent by means of a telecommunications net or with a pager function to the vehicle and received by the control unit 2 via antenna 1.

The control unit 2 is in communications connection with the vehicle door lock system 3, especially a central locking mechanism, and/or with the vehicle ignition lock 4. The door lock system 3 and/or the ignition lock 4 can be activated by a key 5 carried by a vehicle user, which can either be inserted mechanically into one of the vehicle door locks and/or the ignition lock 4 for activation or has a transmitter and/or a transponder for signal transmission. The key 5 can be designed in the usual manner or also as a check card/smart card.

The control unit 2 can be formed by an immobilizer control unit or drive authorization system control unit and contains all functions for opening and locking the vehicle doors and/or for activation and blocking of the engine control. Communication between the actually used key 5 and the control unit 2, which may be unidirectional or bidirectional, can occur via radio transmission, via infrared transmission, or by inductive transmission via a coil. Each of the keys 5 prescribed for the vehicle has a corresponding communications device, for example, a high-frequency (radio) transmitter and/or an infrared transmitter and/or a coil, and/or a transponder for bidirectional communication. The control unit 2 checks whether a used key 5 is authorized or not and releases the corresponding control function (unlocking of the vehicle and/or engine control) when the key is authorized.

The control unit 2 preferably contains a pager receiver connected to the antenna 1. The pager receiver determines the information intended for it and received by antenna 1 and stores it and/or sends it to control unit 2. The pager receiver can have the usual design and be designed separate from the control unit 2, i.e., inserted between antenna 1 and the control unit 2.

The antenna 1 may be a GPS antenna that is mounted on the rear trunk lid or another external antenna that is already present on the motor vehicle. If need be, however, an additional antenna may be prescribed at any convenient location of the vehicle.

Information can be sent to the vehicle via the stationary central office as stipulated by the legal owner or possessor, through which the keys belonging to the vehicle, say eight keys, can be authorized for the first time, or newly authorized or blocked. The information received via the pager receiver or control unit 2 can cause selective blocking or authorization of one or more vehicle keys 5 or release of one or more vehicle keys 5 for a specified number of use processes or a specified number of time units (for example, hours or days). In the latter instance, the control unit 2 contains a calendar function, especially in the form of a real-time clock.

In the device according to the invention the receiver (pager receiver) is permanently installed with the antenna 1 in or on the vehicle, which permits selective blocking or authorization of all keys 5 belonging to the vehicle. The information received via the receiver is temporarily stored in a corresponding memory, for example, in control unit 2. As soon as a key 5 is activated, for example, inserted into the vehicle door lock or ignition lock (or a keyfob is switched for contactless data transmission), the control unit checks whether the key is authorized or not. The used key can also be notified by the control unit 2 whether it is authorized or blocked, in which this information can then be stored in key 5. in a corresponding memory field. The other keys issued for this vehicle remain authorized or block independently of this, depending on the last information supplied for these keys from the central office.

The information need not be sent at regular intervals from the central office to the vehicle. It is sufficient if information is sent from the central office when the use authorization status of one or more keys is to be changed, for example, when the vehicle or a key was stolen, or when a certain, presently unauthorized key is to be reauthorized (for example, for a certain number of cycles or days).

Since considerable space for the antenna 1 and the pager function (receiver) is available in the vehicle, accommodation of the corresponding components poses no problem. Power supply to the corresponding units (antenna circuit, pager receiver, memory, control unit, etc.) can be effected via the vehicle battery, so that no dedicated battery for the receiving function and information storage, as well as evaluation, is required. The antenna 1 can be designed sufficiently large according to requirements and receiving conditions, so that even in unfavorable reception regions sufficiently good information reception is guaranteed. Since each individual key can be selectively blocked, it is also unnecessary to conduct any interventions on the vehicle itself.

If a vehicle key 5 is lost, that key can be selectively blocked by the control unit 2 (after receiving corresponding information from the central office), whereas the other keys can continue to be used by legal possessors. If a previously misplaced key 5 should be found, it can be authorized again selectively via control unit 2 (after receiving the corresponding information supplied from the central office). A replacement key therefore need not be produced.

Nor is it necessary to conduct interventions in already present keys, for example, keys in series. Information exchange with the central office occurs via the pager function of the vehicle, so that the key need only be in communications connection in the defined manner with the door lock system and/or ignition lock.

Each key contains its own identifier that is allocated selectively to this key and is queried by the control unit 2 during key utilization. The control unit 2 contains a memory, in which one or more files are stored that state, for each key identifier, whether the corresponding key is authorized or not. In addition, information can also be contained stating how often or how long the key may (still) be used. The control unit can contain a counting function that is raised during each key utilization or at the beginning of a new time interval (for example, hour or day). If the maximum number stipulated for the corresponding key is reached, the key will no longer be accepted. As an alternative, the counting function can also be implemented so that after corresponding information is supplied from the central office (for example, use authorization for key x for 100 uses), this value is stored and then, with each use of the key, reduced in number and the resulting value stored, which, during subsequent key use, is again decreased by one. As soon as the value zero is reached, the corresponding key is classified as blocked and no longer permits use of the vehicle.

As an alternative, it is also possible to store the use authorization data selectively in the corresponding key in a. corresponding memory field. This memory field can either contain just the overall assertion "use authorized yes/no" or store additional information that represents, for example, the number of admissible future uses still available. In the latter case, during key use, not only is the key identifier queried, but so is this memory field of the control unit and the use authorization recognized from this. The queried number of still admissible future uses is then reduced by the control unit by one and this reduced value stored again in the key.

Authorization and blocking of the key can therefore be caused by bidirectional data transmission between the key 5 and the control unit 2 via the prescribed data transmission path (for example, infrared, high-frequency or inductive line in the key).

Figure 2:
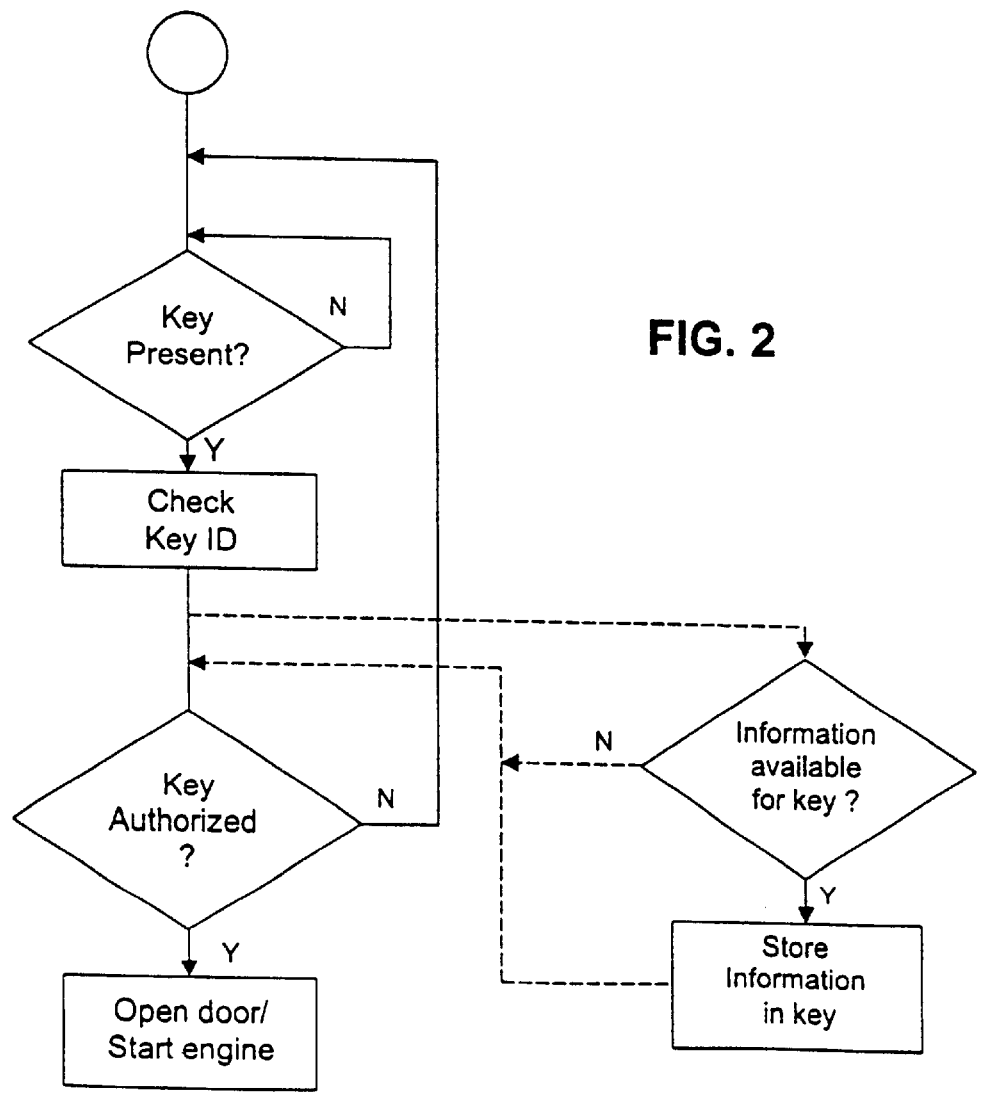
FIG. 2 is a flow chart depicting the method of operation of the device of FIG. 1.

Referring now to FIG. 2, the flow chart illustrates the operation of the device according to the invention, i.e., the process according to the invention. In a step (S1) the control unit 2 cyclically checks whether a key 5 is present or not. During wireless communication, the presence of a key can be detected with reference to the signals sent by this simultaneously containing an identifier. When the door lock and/or ignition lock, however, are to be designed so that insertion of a key 5 is mechanically detected, for example, because of mechanical displacement of a pin produced by the key, the pin position is queried in step (S1) or the corresponding subroutine is called up by the pin output signal, i.e., the step depicted in FIG. 2, in conjunction with step (S1).

If no key is detected in step (S1), the program remains in the waiting loop. However, as soon as a key is detected, step (S2) is called up via the "yes" branch, in which checking of the key identifier occurs. It is then checked in step (S3) whether the identified key is authorized or not. In step (S3), to check key authorization, the corresponding data are accessed, which are stored either in control unit 2 selectively for the individual keys or directly in the corresponding key. If the key is recognized as authorized, in a step (S4) the procedure ordered by the key activation is carried out, i.e., the vehicle door is opened and/or the power supply of the individual consumers is switched on and/or the engine is started, or the like. In step (S3) or (S4) it can also be checked whether a use authorization restriction is recorded for the key, for example, in the form of stipulation of a certain maximum number of uses or a maximum use time. If this is the case, this criterion of the use authorization restriction is likewise checked. If an admissible maximum number of key activations is to be stipulated, the number of future key activations still available is reduced by one and this value stored in control unit 2 and/or in key 5.

As shown in FIG. 2 with the dashed line alternative, instead of a direct transition from step (S2) to step (S3), an additional step sequence (S5), (S6) can be provided, which is used in a variant in which the use authorization information is actively and variably stored in the key itself. In this variant after step (S2) or step (S5) is carried out, it is checked in the control unit 2 whether information is present that is to be stored in the recognized key. If this is not the case, a switch directly to step (S3) is made, otherwise the updated use authorization information is stored in the key in step (S6). This updated information, for example, can cause a previously authorized key to no longer be classified as authorized or, vice versa, a previously blocked key to be reauthorized. This information is stored in a corresponding memory field of the key. In conjunction with step (S6), a switch to step (S3) is then made.

If, for example, the key with the identifier no. 1 is lost or stolen or the entire vehicle with key no. 1 is stolen, the procedure is as follows: As soon as the legal owner notices the loss, he notifies the central office, which thereupon sends the information "block key no. 1" or "key no.1 no longer authorized" to the corresponding vehicle. The pager receiver in the vehicle receives this information and sends it to the control unit 2, which stores this information and notes, in the corresponding key file, that key no. 1 is no longer authorized. If an attempt is then made to open the vehicle and/or start the engine with key no. 1, the result "no" is achieved in step (S3), so that the vehicle doors are no longer opened and the engine control of the possibly already unlocked vehicle cannot be activated.

Use of the vehicle with the other keys (for example, keys no. 2 to 8, with a total of eight keys issued for a vehicle) is still possible without problem, if these are authorized.

The stipulation of a use restriction for a key, for example, for key no. 1, can occur as follows. If the key is to be released for 100 use cycles, the legal vehicle owner informs the central office (service provider), which sends the information "key no. 1 released for 100 cycles" to the corresponding vehicle. The receiver (pager receiver) contained in the vehicle receives this information and sends it to control unit 2, which stores this information and thus authorizes key no. 1 to unlock the vehicle 100 times and release the engine control 100 times. Each subsequent key use is recorded and counted. As soon as the stipulated maximum number of 100 is reached, key no. 1 is no longer considered authorized.

If the key or vehicle is stolen within these 100 cycles, the legal vehicle owner notifies the central office of the loss, which sends corresponding information to the vehicle, classifying the key as unauthorized. Should the vehicle owner not record the vehicle or key loss, the key is still blocked after its $100^{th}$ use, so that the vehicle can no longer be operated in the future with this key. The stipulation of a use restriction therefore automatically leads to erasing of the use authorization of the corresponding key after the use restriction condition arises. This use restriction condition can be not only be the stipulation of number of maximum admissible use cycles, but also any other criterion, for example, stipulation of a maximum use time of, say, 100 days. The information sent by the central office to the vehicle in the latter case consists of the report "release key for 100 days," in which the control unit determines from this on which day the use authorization of key no. 1 expires and permits use of key no. 1 until this day, thereafter classifying the key as unauthorized and thus functionless.

I claim:

1. A device for securing a rotor vehicle against unauthorized use, wherein a plurality of keys are issued for the motor vehicle, comprising:

a receiver mounted in a motor vehicle for directly receiving signals from a central office;

a control unit disposed in the motor vehicle for storing use authorization information received by said receiver from the central office; and at least some vehicle keys issued for the motor vehicle being assigned an identifier different from identifiers assigned to the other vehicle keys, and said control unit being programmed to:

query the identifier of a respective vehicle key upon an activation thereof;

determine if a key authorization is present in said control unit for the respective vehicle key;

determine if a use authorization is present in said control unit for the respective vehicle key only after it has been determined that a key authorization is present in said control unit for the respective vehicle key; and release a function requested by the corresponding key only when use authorization is present in said control unit.

2. The device according to claim 1, wherein said control unit comprises a memory storing use restrictions for one or more vehicle keys, and wherein said control unit no longer accepts a vehicle key as valid if a corresponding use restriction stipulated for the respective key is reached.

3. The device according to claim 2, wherein the use restriction is defined as a maximum admissible number of uses of the corresponding key stored in said control unit, and each use of a vehicle key is selectively counted for the corresponding vehicle key, and a vehicle key is classified as unauthorized upon reaching the maximum admissible number of uses stipulated therefor.

4. The device according to claim 1, wherein said control unit contains a memory storing a time value for the corresponding vehicle key, and said control unit no longer accepts as valid a vehicle key a time value of which has been reached.

5. The device according to claim 4, wherein the time value is stored as an admissible number of use days.

6. The device according to claim 1, wherein the data received by said control unit from the central office contain a vehicle key identifier notifying said control unit for which respective vehicle key the transmitted information is to be stored.

7. The device according to claim 1, wherein the data received by said control unit from the central office contain a vehicle key identifier notifying said control unit for which respective vehicle key one of a transmitted maximum use number and a time value is to be stored.

8. The device according to claim 1, wherein said key authorization is stored in said control unit.

9. A method of blocking a motor vehicle against unauthorized use, which comprises;

selectively sending use authorization information for each of a plurality of vehicle keys of a motor vehicle from a central office to a control unit disposed in the motor vehicle, wherein each vehicle key is provided with its own identifier;

determining upon an activation of a respective vehicle key if a key authorization is present in the control unit for the respective vehicle key;

determining only after it has been determined that a key authorization is present in the control unit for the respective vehicle key, if a use authorization is present in the control unit for the respective vehicle key; and releasing a function requested by the respective key only when use authorization is present in the control unit.

10. The method according to claim 9, wherein the step of determining upon an activation of a respective vehicle key if a key authorization is present for the respective vehicle key is performed by accessing key authorization information stored in a control unit.

* * * * *